W. L. BURLEY & B. A. GILLIOTTE.
APPARATUS FOR BURNING EARTHENWARE.
APPLICATION FILED MAR. 30, 1912.
1,071,663.
Patented Aug. 26, 1913.
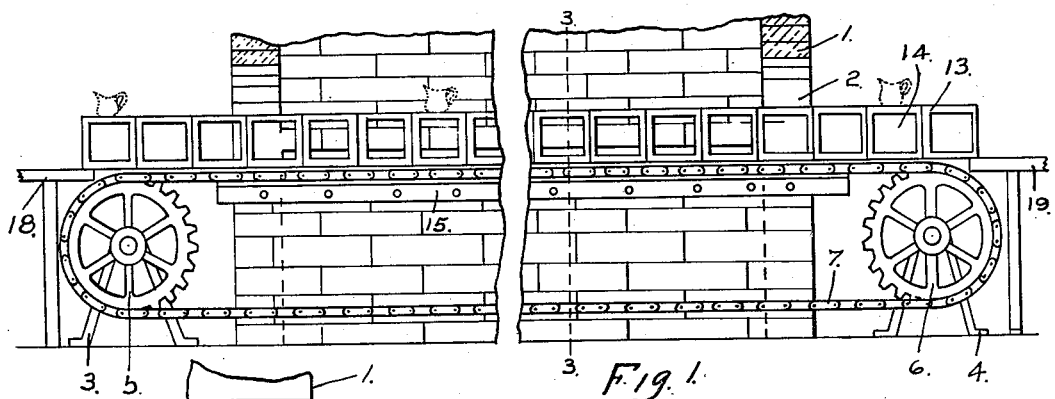
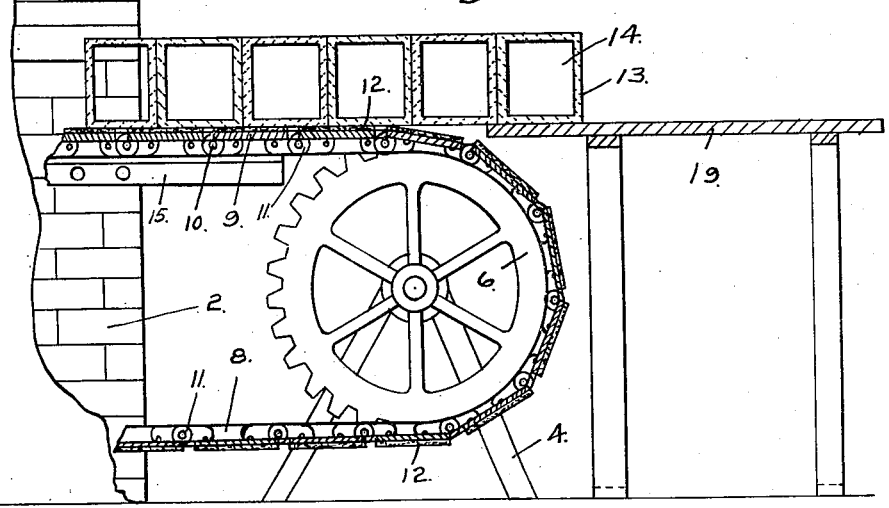
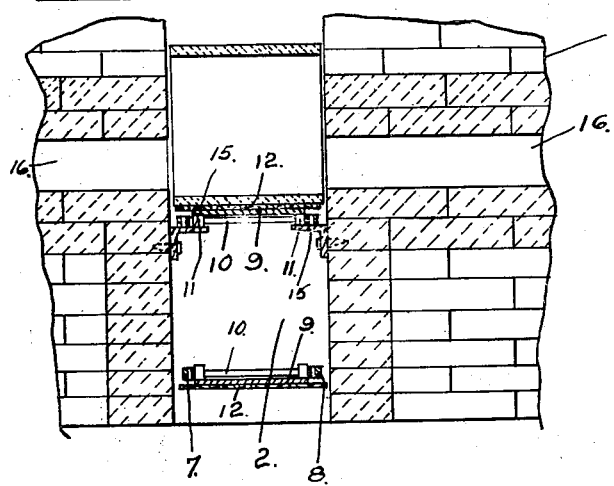
Witnesses
H. M. Gillespie
A. L. Phelps
Inventor
Wilson L. Burley
Benjamin A. Gilliotte
By C. C. Shepherd, Attorney

UNITED STATES PATENT OFFICE.

WILSON L. BURLEY AND BENJAMIN A. GILLIOTTE, OF CROOKSVILLE, OHIO.

APPARATUS FOR BURNING EARTHENWARE.

1,071,663.  Specification of Letters Patent.  Patented Aug. 26, 1913.

Application filed March 30, 1912. Serial No. 687,472.

*To all whom it may concern:*

Be it known that we, WILSON L. BURLEY and BENJAMIN A. GILLIOTTE, citizens of the United States, residing at Crooksville, in the county of Perry and State of Ohio, have invented certain new and useful Improvements in Apparatus for Burning Earthenware, of which the following is a specification.

Our invention relates to an apparatus for burning earthenware and is directed to the provision of an improved device for rapidly handling such ware to effectually and evenly burn the same in a comparatively short period of time. In carrying forth this idea, we have provided a kiln having transverse flue openings therein extending longitudinally throughout its length, whereby a very uniform heating action may be obtained by passing hollow saggar blocks between these transverse openings. These saggar blocks are adapted to carrying earthen ware in any desired position and consequently, by a continuous movement, such as an endless carrier, the articles may be burned to a high degree of perfection.

The preferred mechanism for carrying out our invention is shown in the accompanying drawings, in which similar characters of reference designate corresponding parts, and in which—

Figure 1 is a vertical section of the lower portion of a kiln with our invention applied thereto, Fig. 2 is a detail view of the discharging end of the conveyer element, and, Fig. 3 is a section taken on line 3—3 of the structure shown in Fig. 1.

In the drawings, the kiln is shown at 1 as having a passage 2 extending entirely therethrough, which passage is adapted to accommodate an endless chain element comprising, in its entirety, trunnions 3 and 4, sprocket wheels 5 and 6 and driving chains 7 and 8. These driving chains 7 and 8 extend over and are driven by sprocket wheels 5 and 6 and they furnish a supporting medium for a plurality of slat elements 9 which are hingedly secured together by rods 10 and complemental ears 11 and which serve as supports for "saggar blocks" to be described. These slats desirably have their outer surfaces covered with asbestos layers 12 and upon these layers 12 are to be placed "saggar blocks" 13 which are preferably of substantially cubical form, but provided with openings 14 therethrough extending transversely to the direction of travel of the chain. The upper side of this chain element is prevented from sagging by guideways 15 and this upper side is preferably disposed just below transverse flues 16 having practically continuous openings longitudinally of the kiln, and which because of their location and the form of the "saggar blocks" direct currents of heated air continually through the openings formed in the "saggar blocks".

In operation of the structure thus far described, it will be apparent that the articles of earthen ware are placed upon the "saggar blocks" at the left-hand side of the machine as shown in Fig. 1 and the movement of the belt in normal direction toward the right conducts the articles of earthen ware through the kiln and therefore necessarily into and through the zone of heat. During the passage of the "saggar blocks" through the kiln, they are continually subjected to the influence of heat currents playing upon their interior walls and necessarily imparting heat by conduction and radiation to the articles carried upon their upper sides. The passage of the earthen ware articles through the kiln may be timed as desired, but each article is preferably subjected to the heat during a period of approximately twenty minutes.

In the preferred mechanism utilized, we desirably provide tables or supports 18 and 19, although it will of course be understood that these supports may vary as to form.

By a simple and apparently readily conceivable mechanism, we are enabled to burn earthen ware in a short length of time and yet the actual workers in the art are today spending forty-eight hours in doing what we accomplish in twenty minutes.

What we claim, is—

A machine for burning earthen ware comprising a kiln having opposed transverse flue passages extending continuously longitudinally of the kiln, an endless carriage for continuous movement through said kiln, and a plurality of individual hollow saggar blocks for disposition upon said carriage and between said flue passages whereby they are subjected to a uniform heat during their movement through said kiln.

In testimony whereof we affix our signatures in presence of two witnesses.

WILSON L. BURLEY.
BENJAMIN A. GILLIOTTE.

Witnesses:
WM. BRADSHAW,
OLLIE CANNON.